(12) United States Patent
Kwon (10) Patent No.: US 10,274,059 B2
(45) Date of Patent: Apr. 30, 2019

(54) TRANSMISSION

(71) Applicant: Yoon Gu Kwon, Gyeonggi-do (KR)

(72) Inventor: Yoon Gu Kwon, Gyeonggi-do (KR)

( * ) Notice: Subject to any disclaimer, the term of this patent is extended or adjusted under 35 U.S.C. 154(b) by 351 days.

(21) Appl. No.: 15/035,864

(22) PCT Filed: Nov. 7, 2014

(86) PCT No.: PCT/KR2014/010698
§ 371 (c)(1),
(2) Date: May 11, 2016

(87) PCT Pub. No.: WO2016/068371
PCT Pub. Date: May 6, 2016

(65) Prior Publication Data
US 2016/0290445 A1    Oct. 6, 2016

(30) Foreign Application Priority Data
Oct. 29, 2014  (KR) ........................ 10-2014-0147850

(51) Int. Cl.
*F16H 3/70* (2006.01)
*F16H 35/00* (2006.01)
*F16H 1/32* (2006.01)
*F16H 1/28* (2006.01)

(52) U.S. Cl.
CPC ................. *F16H 3/70* (2013.01); *F16H 1/32* (2013.01); *F16H 35/008* (2013.01); *F16H 2001/2881* (2013.01); *F16H 2001/322* (2013.01); *F16H 2200/0034* (2013.01)

(58) Field of Classification Search
CPC .... F16H 1/32; F16H 1/227; F16H 2001/2881; F16H 2001/322; F16H 2001/327; F16H 3/44; F16H 3/70; F16H 3/663; F16H 3/666; F16H 2003/442; F16H 35/008; F16H 2037/047; F16H 2200/20; F16H 2200/2002; F16H 2712/06
USPC .......... 475/169, 170, 177, 302; 74/332, 393, 74/395, 397, 399
See application file for complete search history.

(56) References Cited

U.S. PATENT DOCUMENTS 2,144,964 A * 1/1939 De Falco ............... F16H 1/006
                                                74/397
3,106,107 A * 10/1963 Hardy .................... F16D 67/00
                                                475/281
4,497,221 A    2/1985 Koser
(Continued)

FOREIGN PATENT DOCUMENTS

CN    202756551 U    2/2013
CN    103335073 A    10/2013
(Continued)

OTHER PUBLICATIONS

Japanese Office Action for corresponding Japanese Application No. 2017-543675 dated Mar. 13, 2018.
(Continued)

*Primary Examiner* — William C Joyce
*Assistant Examiner* — Joseph Brown
(74) *Attorney, Agent, or Firm* — Wegman, Hessler & Vanderburg (57) ABSTRACT

A transmission includes an input shaft, an output shaft, and a transmission device, the transmission device including a ring gear, an input member, a gear shifting slider, and an output gear.

10 Claims, 8 Drawing Sheets

(56) References Cited

U.S. PATENT DOCUMENTS

| | | | |
|---|---|---|---|
| 4,807,494 A | 2/1989 | Lew | |
| 5,507,701 A | 4/1996 | Benesch | |
| 6,807,878 B2 * | 10/2004 | Wren | F16H 29/18 |
| | | | 475/170 |
| 7,549,357 B2 * | 6/2009 | Hammerbeck | F16H 1/32 |
| | | | 475/162 |
| 2010/0229665 A1 | 9/2010 | Ambardekar | |
| 2011/0201470 A1 * | 8/2011 | Durnin | F16H 3/72 |
| | | | 475/149 |
| 2013/0126201 A1 | 5/2013 | Zhang et al. | |

FOREIGN PATENT DOCUMENTS

| | | | | |
|---|---|---|---|---|
| CN | 103982600 A | 8/2014 | | |
| DE | 3807500 A1 | 9/1989 | | |
| DE | 102009026780 A1 * | 12/2010 | | B63H 23/06 |
| EP | 1158208 A | 11/2001 | | |
| FR | 389088 | 3/1908 | | |
| JP | 2001336587 | 12/2001 | | |
| KR | 2009-0116389 | 11/2009 | | |
| KR | 20130056370 | 5/2013 | | |

OTHER PUBLICATIONS

International Search Report for International Application No. PCT/KR2014/010698 dated Jul. 17, 2015.
European Search Report for corresponding European Patent Application No. EP14904764.9 dated Oct. 16, 2017.
Office Action dated Dec. 29, 2018, issued in Chinese Application No. 201480083089.0, 12 pages.

* cited by examiner

TRANSMISSION

CROSS-REFERENCE TO RELATED APPLICATIONS

This application claims the priority of Korean Patent Application No. 10-2014-0147850 filed on Oct. 29, 2014 in the Korean Intellectual Property Office, the disclosure of which is incorporated herein by reference.

BACKGROUND OF THE INVENTION

Field of the Invention

The present invention relates to a transmission for changing the power transmitted from an input shaft to an output shaft, and more particularly, to a transmission using a planetary gear.

Description of the Related Art

In general, apparatuses using power, such as machine tools, vehicles or the like do not directly use the power transmitted from a power source but change an input speed and a torque of input power by using a transmission to obtain a required speed and a torque.

Such transmissions decrease or increase the number of revolutions of an input shaft at an output shaft by using an arrangement of gears to induce a gear shift, and the gears are generally used through a method in which spur gears are coupled in multiple stages using the diameter and number of teeth thereof.

However, the existing transmissions have limitations in that since the speed change is generated by the engagement of shifting gears, noise and wear are caused by friction, and especially the power speed change efficiency is inferior due to the large size and a large installation space thereof.

SUMMARY OF THE INVENTION

An aspect of the present invention provides a transmission using a planetary gear train to improve the convenience in manufacturing, assembly, and installation and especially to improve gear shifting capability.

According to an aspect of the present invention, there is provided a transmission including: an input shaft, an output shaft receiving power from the input shaft, and a transmission device changing the power transmitted from the input shaft to the output shaft, the transmission device including: a ring gear; an input member including an input gear which internally contacts one side of the ring gear and rotates the ring gear while being rotated by the power transmitted from the input shaft, and a guide bar passing through a center point A of the input gear and a center point B of the ring gear; a gear shifting slider which has one end coupled to the guide bar to be movable to the center point A of the input gear and the center point B of the ring gear, and the other end coupled to the input shaft and which changes the rotation center of the input gear to change a torque of the ring gear; and an output gear internally contacting the other side of the ring gear, and transmitting changed power to the output shaft while being rotated by the ring gear.

When the gear shifting slider is positioned at the center point A of the input gear, as the input shaft rotates through one revolution, the input gear may rotate through one revolution about the center point A, as the input gear rotates through one revolution, the ring gear may rotate through one revolution or less about the center point B to reduce a torque thereof and the reduced torque is transmitted to the output shaft through the output gear, whereby a speed change is generated.

When the gear shifting slider is positioned at the center point B of the ring gear, as the input shaft rotates through one revolution, the input gear may rotate through one revolution about the center point B, as the input gear rotates through one revolution, the ring gear may rotate through one revolution about the center point B and the torque of the ring gear is transmitted to the output shaft through the output gear, whereby a speed change is generated.

The gear shifting slider may include: a coupling part movably coupled to the guide bar; and a coupling bar which has one end rotatably coupled to the coupling part in a length direction of the guide bar, and the other end rotatably coupled to the input shaft in the length direction of the guide bar.

The input gear may internally contact a lower portion of one side of the ring gear, and the output gear may internally contact an upper portion of the other side of the ring gear such that the input gear and the output gear maybe spaced apart from each other so as not to interfere with each other in a vertical direction.

A center point C of the output gear may be positioned on a centerline passing through the center point A of the input gear and the center point B of the ring gear.

The gear ratio of the input gear and the ring gear to the output gear may be defined as 2:4:1.

The transmission may further include a gear shifting bar for moving the gear shifting slider to the center point A of the input gear and the center point B of the ring gear.

The transmission device is provided in plurality and the plurality of the transmission devices may be connected between the input shaft and the output shaft such that a torque may be transmitted, and thus may change the torque transmitted to the output shaft into a plurality of stages.

The plurality of transmission devices may connect the gear shifting sliders to output gears in corresponding transmission devices such that a torque maybe transmitted, may connect the gear shifting slider of the transmission device located at a lowest stage to the input shaft such that a torque may be transmitted, and may connect the output gear of the transmission device located at a highest stage to the output shaft such that a torque may be transmitted.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings so that those skilled in the art pertaining to the present invention easily implement the embodiment. However, the present invention can be practiced in various ways and is not limited to the embodiments described herein. Also, parts in the drawings unrelated to the detailed description are omitted to ensure clarity of the present invention. Like reference numerals in the drawings denote like elements throughout.

A transmission 100 according to the present invention includes an input shaft 110 connected to a power transmission device (not shown), an output shaft 120 receiving power from the input shaft 110 and rotating a driving device (not shown), and a transmission device 130 changing the power transmitted from the input shaft 110 to the output shaft 120.

Figure 1:
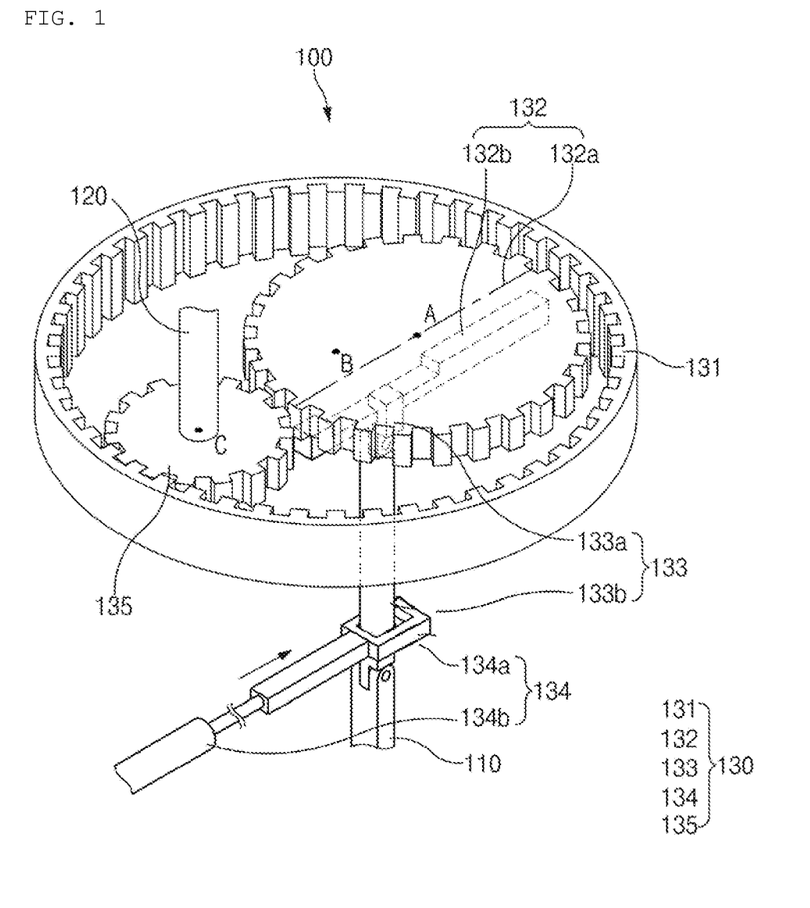
FIG. 1 is a perspective view illustrating a transmission according to an embodiment of the present invention.
Figure 2:
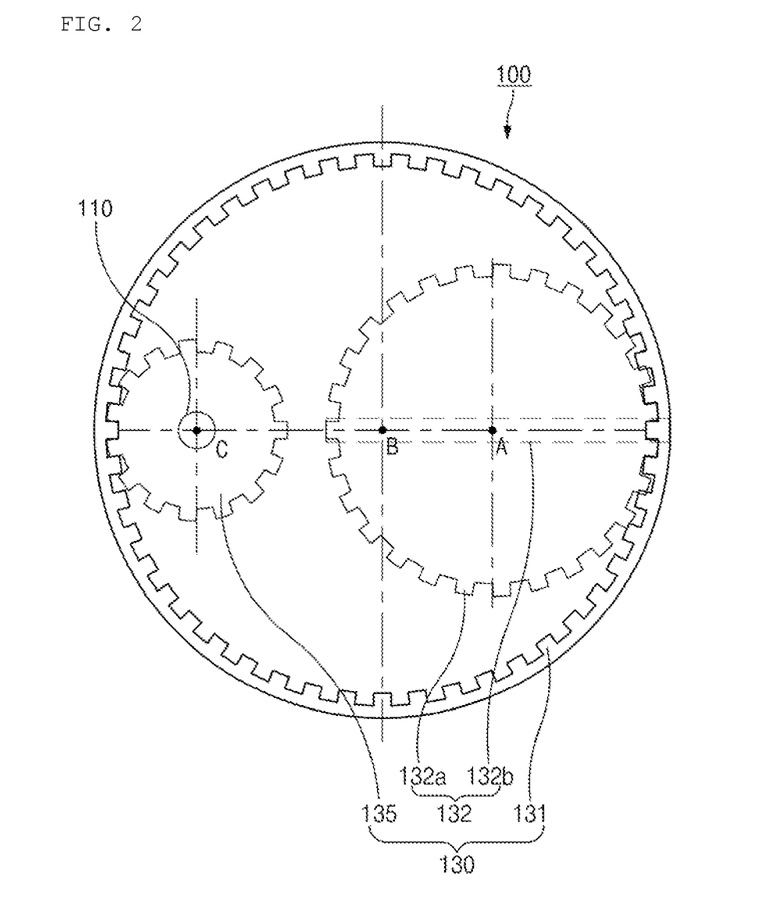
FIG. 2 is a plan view illustrating a transmission according to an embodiment of the present invention.
Figure 3:
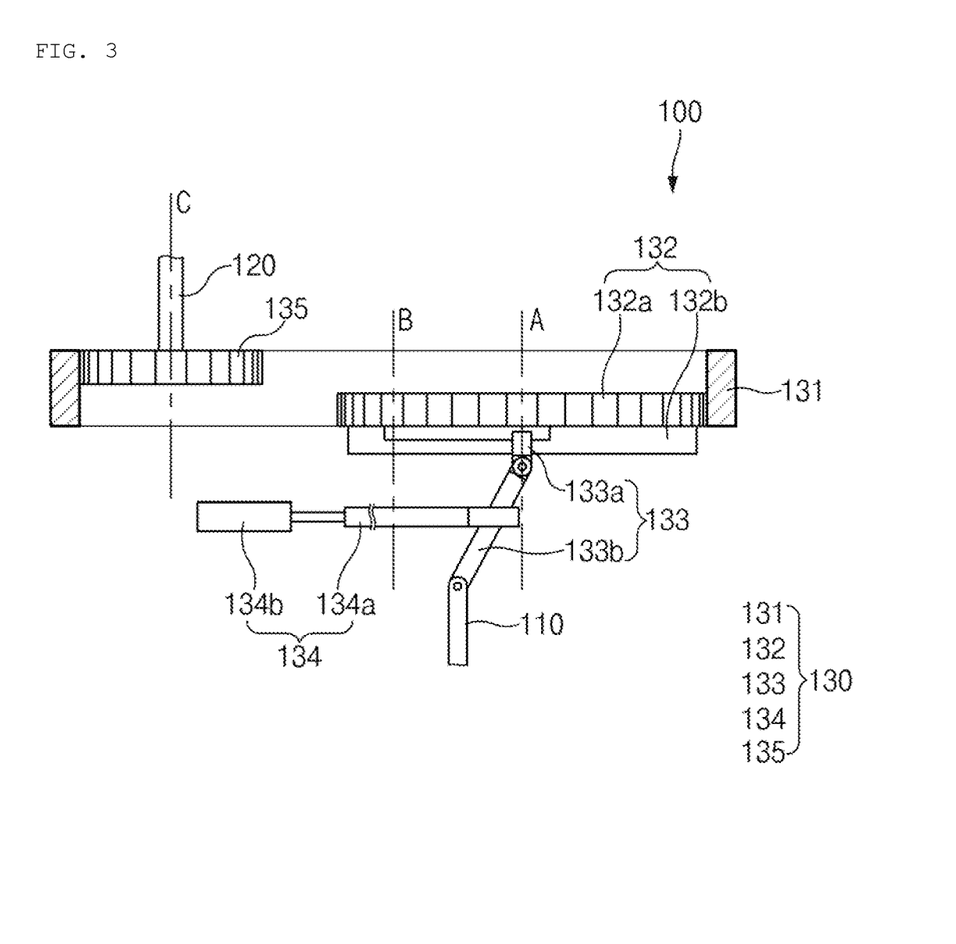
FIG. 3 is a cross-sectional view illustrating a transmission according to an embodiment of the present invention.

Here, the transmission device 130 is configured to perform a speed change between the input shaft 110 and the output shaft 120 as illustrated in FIGS. 1 and 2, and especially has a coupling structure such as a planetary gear train, thereby having a convenience in manufacturing, assembly, and installation For example, the transmission device 130 includes: a ring gear 131; an input member 132 for rotating the ring gear 131 by a torque transmitted from the input shaft 110, a gear shifting slider 133 for changing the rotation center of the input member 132 to change the torque of the ring gear 131; a gear shifting bar 134 for moving the gear shifting slider 133, and an output gear 135 for rotating the output shaft 120 by the torque transmitted from the ring gear 131.

The ring gear 131 is disposed rotatable about the rotation center B of a main body (not shown) of the transmission device 130, has a shape of circular band having an inner circumferential surface on which gears are formed, one side of which the input member 132 internally contacts, and the other side of which the output gear 135 internally contacts.

That is, when the input member 132 is rotated, the ring gear 131 and the output gear 135 are also rotated in the same direction as the input member 132.

The input member 132 includes an input gear 132a which internally contacts the one side of the ring gear 131 and rotates the ring gear 131 while being rotated by the power transmitted from the input shaft 110, and a guide bar 132b passing through a center point A of the input gear 132a and a center point B of the ring gear 131. Here, the gear shifting slider 133 is coupled to the guide bar 132b.

The gear shifting slider 133 is coupled to the guide bar 132b, and moves from the center point A of the input gear 132a to the center point B of the ring gear 131 or moves from the center point B of the ring gear 131 to the center point A of the input gear 132a.

That is, the gear shifting slider 133 includes: a coupling part 133a movably coupled to the guide bar 132b; and a coupling bar 133b which has one end rotatably coupled to the coupling part 133a in a forward-backward direction which is the length direction of the guide bar 132b, and the other end rotatably coupled to the input shaft 110 in a forward-backward direction which is the length direction of the guide bar 132b.

When this gear shifting slider 133 is positioned at the center point B of the ring gear 131, the input gear 132a rotates the ring gear 131 while revolving about the center point B of the ring gear 131, and at this time, the input gear 132a and the ring gear 131 have the same revolution ratio.

Also, when the gear shifting slider 133 is positioned at the center point A of the input gear 132a, the input gear 132a rotates the ring gear 131 while being rotated about the center point A of the input gear 132a, and at this time, the ring gear 131 rotates through one revolution or less when the input gear 132a rotates through one revolution.

Accordingly, as the gear shifting slider 133 is positioned at the center point B of the ring gear 131 or the center point A of the input gear 132a, the rotation of the ring gear 131 may be shifted.

The gear shifting bar 134 includes a movable part 134a disposed on the coupling bar 133b of the gear shifting slider 133, and a cylinder 134b which pushes of pulls the movable part 134a to allow the coupling part 133a of the gear shifting slider 133 to be positioned at the center point A of the input gear 132a or the center point B of the ring gear 131.

That is, when the gear shifting bar 134 pushes or pulls the movable part 134a through the cylinder 134b, the gear shifting slider 133 is positioned at the center point A of the input gear 132a or the center point B of the ring gear 131 while the coupling bar 133b is moved along the guide bar 133 about the input shaft 110.

The output gear 135 internally contacts the other side of the ring gear 131, and the output shaft 120 is connected to a center point C of the output gear 135. That is, the output gear 135 transmits the shifted torque to the output shaft 120 while being rotated by the ring gear 131.

Here, the input gear 132a and the output gear 135 are positioned in the ring gear 131 at heights different from each other. That is, the input gear 132a internally contacts a lower portion of one side of the ring gear 131, and the output gear 135 internally contacts an upper portion of the other side of the ring gear 131. In other words, the input gear 132a and the output gear 120 do not interfere with each other in the vertical direction, and thus the input gear 132a is prevented from colliding with the output gear 120 during the revolution thereof.

The transmission 100 according to the present invention configured as described above is capable of performing a speed change through the transmission device 130 provided between the input shaft 110 and the output shaft 120, and especially the transmission device 130 has a simple structure, thereby realizing a convenience in manufacturing, assembly, and installation.

Hereinafter, operation states of the transmission according to the present invention will be described in detail with reference to the accompanying drawings.

Figure 4:
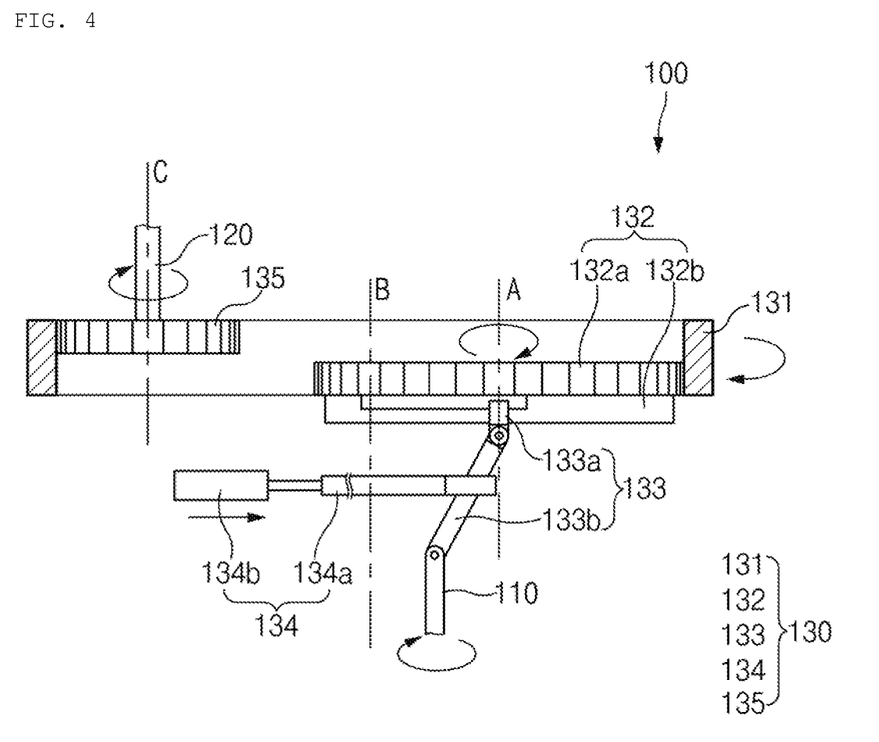
FIGS. 4 and 5 are views illustrating a transmission according to an embodiment of the present invention in a state of being rotated about the center point A of an input gear.

As illustrated in FIG. 4, the gear shifting slider 133 is moved along the guide bar 132b by the gear shifting bar 134 and positioned at the center point A of the input gear 132a. In this state, when the input shaft 110 is rotated, the gear shifting slider 133 is rotated by the input shaft 110, the input gear 132a is rotated about the center point A by the gear shifting slider 133, that is, rotated on the axis thereof, the ring gear 131 is rotated through the rotation of the input gear 132a, the output gear 135 is rotated through the rotation of the ring gear 131, and the output shaft 120 is rotated by the output gear 135.

Here, when the input gear rotates through one revolution, the ring gear 131 rotates through one revolution or less, and thus a speed change is generated.

Figure 5:
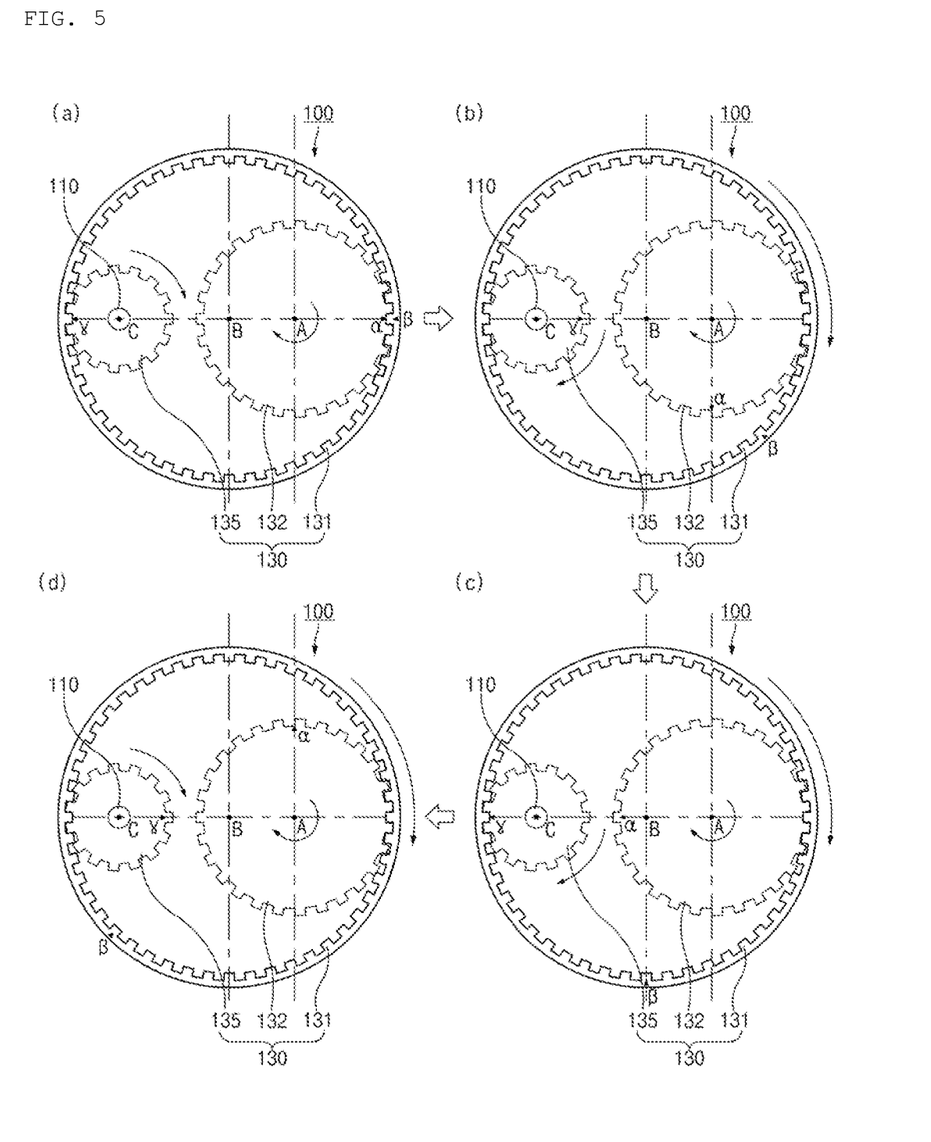

More specifically, as illustrated in FIG. 5A, the engaged position of the input gear 132a and the ring gear 131 are respectively denoted by α and β, and the engaged position of the output gear 135 with the ring gear 131 is denoted by γ. Here, the gear ratio of the input gear 132a and the ring gear 131 to the output gear 135 is set to 2:4:1, that is, when the ring gear 131 rotates through one revolution, the input gear 132a rotates through two revolutions, and the output gear 135 rotates through 4 revolutions.

Here, since the gear ratio of the input gear 132a and the ring gear 131 to the output gear 135 is set to 2:4:1, an accurate gear ratio may be set and the speed change efficiency may be improved.

In such a state, as illustrated in FIG. 5B, when the input gear 132a rotates through 90° (see point α) about the center point A, the ring gear 131 is rotated through 45° (see point β) by the input gear 132a, and the output gear 135 is rotated through 180° (see point γ) by the ring gear 131.

As such, as illustrated in FIG. 5C to 5D, when the input gear 132a rotates through 90° (see point α) about the center point A, a torque is transmitted while the ring gear is rotated through 45° (see point β), and the output gear is rotated through 180°.

Figure 6:
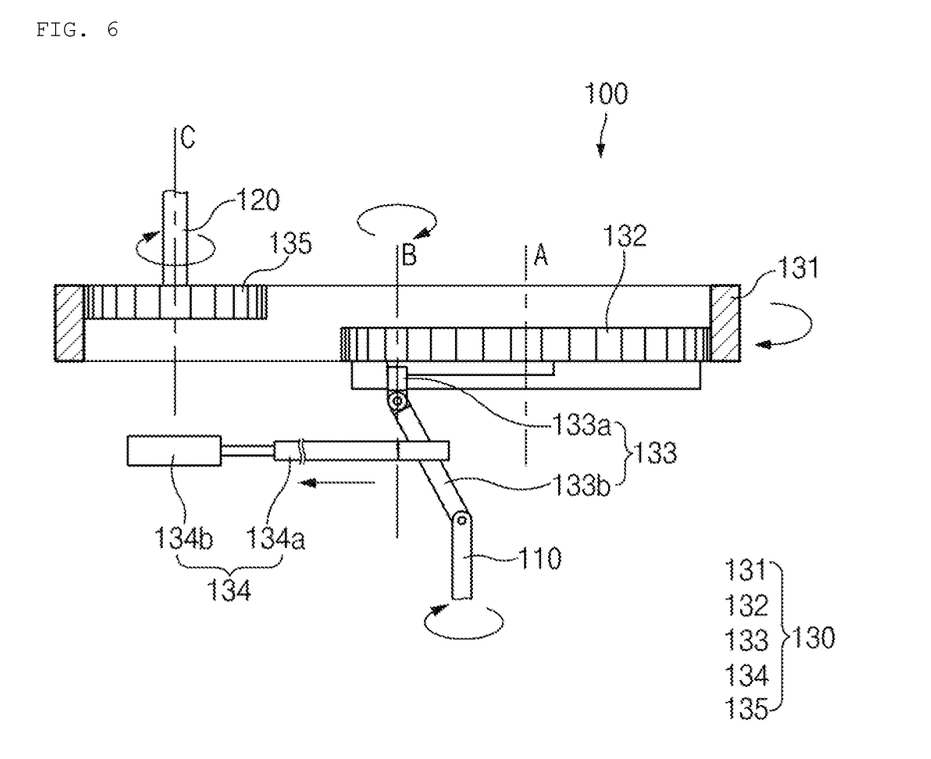
FIGS. 6 and 7 are views illustrating a transmission according to an embodiment of the present invention in a state of being rotated about the center point B of a ring gear.

As illustrated in FIG. 6, when the gear shifting slider 133 is moved along the guide bar 132b by the gear shifting bar 134 and positioned at the center point B of the ring gear 131, the gear shifting slider 133 is rotated by the input shaft 110, the input gear 132a is rotated about the center point B by the gear shifting slider 133, that is, revolved, the ring gear 131 is rotated through the revolution of the input gear 132a, the output gear 135 is rotated through the rotation of the ring gear 131, and the output shaft 120 is rotated by the output gear 135.

Here, when the input gear 132a rotates through one revolution, the ring gear 131 is also rotated through one revolution, and thus a speed change is generated.

Figure 7:
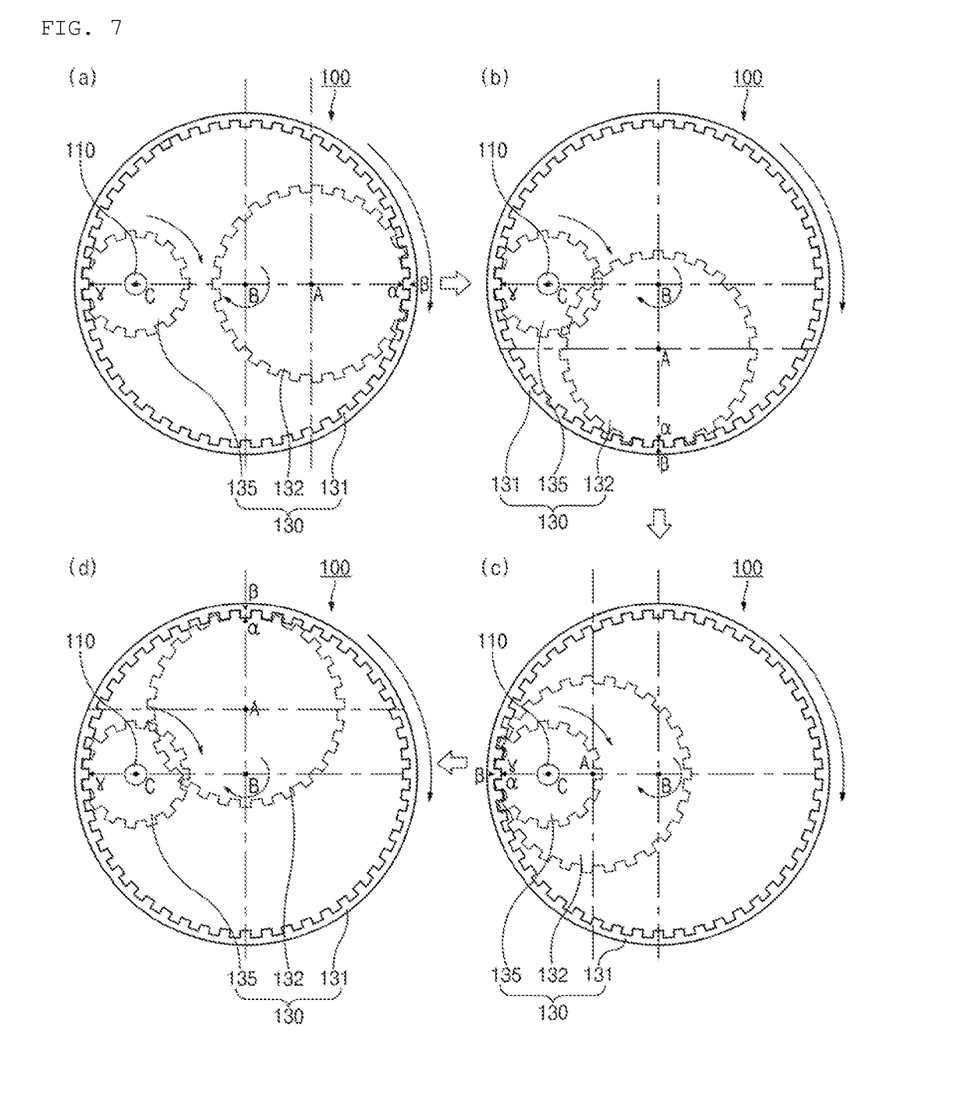

More specifically, as illustrated in FIG. 7A, the engaged position of the input gear 132a and the ring gear 131 are respectively denoted by α and β, and the engaged position of the output gear 135 with the ring gear 131 is denoted by γ. Here, the gear ratio of the input gear 132a and the ring gear 131 to the output gear 135 is set to 2:4:1, that is, when the ring gear 131 rotates through one revolution, the input gear 132a rotates through two revolutions, and the output gear 135 rotates through 4 revolutions.

In such a state, as illustrated in FIGS. 7B to 7D, when the input gear 132a revolves through 90° (see point α) about the center point B of the ring gear 131, the ring gear 131 is rotated through 90° (see point β) by the revolution of the input gear 132a, and the output gear 135 is rotated through 360° (see point γ) by the ring gear 131.

That is, when the input gear 132a is revolved through one revolution, the ring gear 131 is rotated through one revolution, and the output gear 135 is rotated through 4 revolutions.

Hereinafter, in the description of transmission according to another embodiment of the present invention, components having the same structures and functions as those in previous embodiments will be given the same reference numerals in the drawings, and duplicated description thereof will not be provided.

Figure 8:
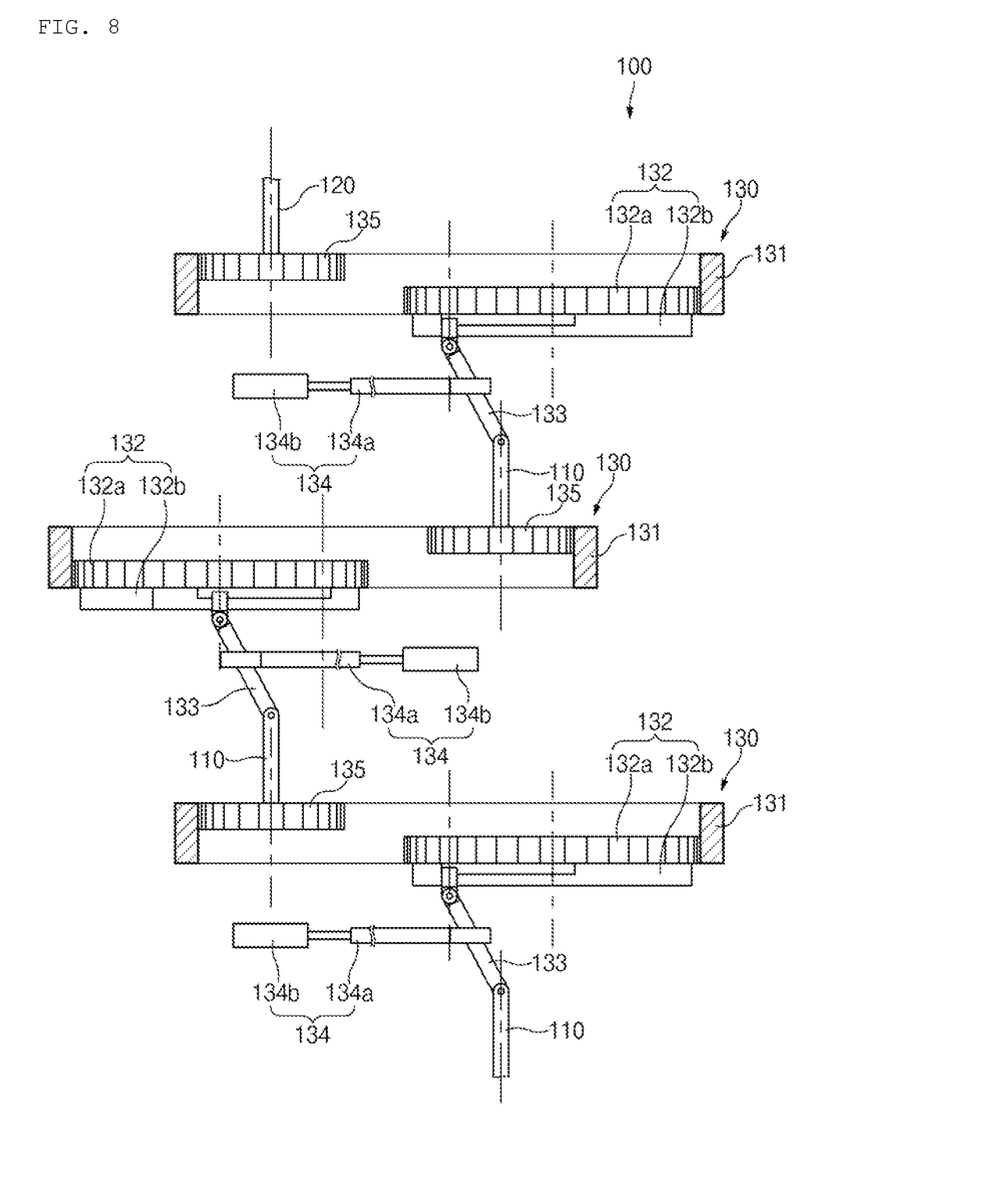
FIG. 8 is a view illustrating another embodiment of a transmission according to the present invention.

FIG. 8 is a view illustrating another embodiment of a transmission according to the present invention.

A transmission according to this embodiment includes a transmission device 130 between an input shaft 110 and an output shaft 120, wherein a plurality of transmission devices are connected between the input shaft 110 and the output shaft 120 such that a torque may be transmitted, and change the torque transmitted from the input shaft 110 to the output shaft 120 into a plurality of stages.

Since the transmission device 130 has the same configuration and function as the transmission device described above, the overlapping description thereof will not be provided.

That is, in the plurality of transmission devices 130, a gear shifting sliders 133 and the output gears 135 of transmission devices 130 corresponding to each other are connected such that a torque may be transmitted, the gear shifting slider 133 of the transmission device 130 positioned at the lowest stage is connected to the input shaft 110 such that a torque may be transmitted, and the output gear 135 of the transmission device 130 positioned at the highest stage is connected to the output shaft 120 such that a torque may be transmitted.

Accordingly, the transmission having a plurality of transmission devices 130 locates the positions of the gear shifting sliders 133 included in the plurality of transmission devices 130 at center points A of the input gears 132a or center points B of the ring gears 131, and thus may perform a multistage gear shift.

According to the present invention, a transmission is provided to include a transmission device having a coupling structure such as a planetary gear train, so that there are effects in that the convenience in manufacturing, assembly and installation is improved and particularly, the speed change power is improved.

The scope of the present invention is not defined by the detailed description of the present invention but by the appended claims, and all modifications and changes induced from the spirit and scope of the present invention and the equivalent concept will be construed as being included in the present invention.

What is claimed is:

1. A transmission, comprising:
an input shaft;
an output shaft receiving power from the input shaft; and
a transmission device changing torque and speed transmitted from the input shaft to the output shaft, the transmission device comprising:
a ring gear;
an input member including an input gear which internally contacts one portion of the ring gear and rotates the ring gear while being rotated by the power transmitted from the input shaft, and a guide bar passing through a center point A of the input gear located at a center of the input gear in a direction along a diameter of the input gear and a center point B of the ring gear located at a center of the ring gear in a direction along a diameter of the ring gear;
a gear shifting slider which has one end coupled to the guide bar to be movable to the center point A of the input gear and the center point B of the ring gear, and another end coupled to the input shaft and which changes a rotation center of the input gear to change a torque of the ring gear; and
an output gear internally contacting another portion of the ring gear which is not contacted with the input gear, and transmitting changed torque and speed to the output shaft while being rotated by the ring gear.

2. The transmission of claim 1, wherein when the gear shifting slider is positioned at the center point A of the input gear, as the input shaft rotates through one revolution, the input gear rotates through one revolution about the center point A, as the input gear rotates through one revolution, the ring gear rotates through less than one revolution about the center point B to reduce a torque thereof, and the reduced torque of the ring gear is transmitted to the output shaft through the output gear, whereby a speed change is generated.

3. The transmission of claim 1, wherein when the gear shifting slider is positioned at the center point B of the ring gear, as the input shaft rotates through one revolution, the input gear rotates through one revolution about the center point B, as the input gear rotates through one revolution, the ring gear rotates through one revolution about the center point B and the torque of the ring gear is transmitted to the output shaft through the output gear, whereby a speed change is generated.

4. The transmission of claim 1, wherein the gear shifting slider comprises: a coupling part movably coupled to the guide bar; and a coupling bar which has one end rotatably coupled to the coupling part along a direction which is perpendicular to a length direction of the guide bar and a length direction of the coupling bar, and another end rotatably coupled to the input shaft along a direction which is perpendicular to the length direction of the guide bar and the length direction of the coupled bar.

5. The transmission of claim 1, wherein the input gear internally contacts a lower portion of the one portion of the ring gear, and the output gear internally contacts an upper portion of the other portion of the ring gear such that the input gear and the output gear are spaced apart from each other so as not to interfere with each other in a vertical direction.

6. The transmission of claim 1, wherein a center point C of the output gear is positioned on a centerline passing through the center point A of the input gear and the center point B of the ring gear.

7. The transmission of claim 1, wherein a gear ratio of the input gear and the ring gear to the output gear is defined as 2:4:1.

8. The transmission of claim 1, further comprising a gear shifting bar for moving the gear shifting slider to the center point A of the input gear and the center point B of the ring gear.

9. The transmission of claim 1, wherein the transmission device is provided in plurality and the plurality of transmission devices are connected between the input shaft and the output shaft such that the torque is transmitted, and thus change the torque transmitted to the output shaft into a plurality of stages, wherein the plurality of transmission devices connect the gear shifting sliders to output gears in corresponding transmission devices such that the torque is transmitted, connect the gear shifting slider of the transmission device located at a lowest stage to the input shaft such that the torque is transmitted, and connect the output gear of the transmission device located at a highest stage to the output shaft such that the torque is transmitted.

10. The transmission of claim 1, wherein when the gear shifting slider is positioned at the center B of the ring gear, the ring gear is revolved through one revolution around the center point B when the input gear is rotated through one revolution around center point B.

* * * * *